Figure 1:
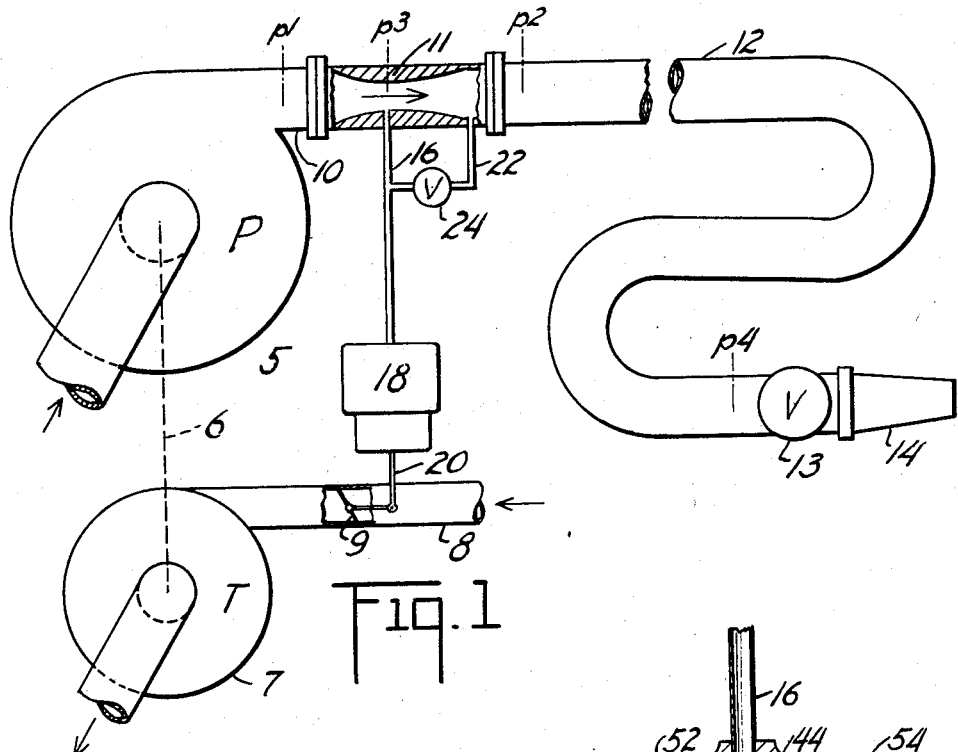

July 12, 1960 M. MEYER 2,944,488

PUMP CONTROL SYSTEMS

Filed Aug. 31, 1954

INVENTOR
MARVIN MEYER
BY
ATTORNEY

United States Patent Office 2,944,488
Patented July 12, 1960

2,944,488

PUMP CONTROL SYSTEMS

Marvin Meyer, Caldwell, N.J., assignor to Curtiss-Wright Corporation, a corporation of Delaware Filed Aug. 31, 1954, Ser. No. 453,375

8 Claims. (Cl. 103—16)

This invention relates to control systems for fluid pumps. In particular it consists of a control system to hold constant pressure in a fluid delivery line from a pump, at a point downstream from the pump.

In some types of pump systems, a variable pressure or variable flow pump delivers fluid to an extended conduit such as a hose. It may be desirable to maintain constant pressure at some point along the hose. For instance, in an aircraft air-to-air refueling system, the tanker aircraft includes a fuel pump and an extended delivery conduit which at times is coupled to a receiving aircraft. To attain maximum fuel delivery to the receiving aircraft, it is desirable to maintain constant fuel pressure at the hose nozzle, regardless of the resistance to the flow of fuel from the nozzle into the tanks of the receiving aircraft. An obvious way to regulate the tanker delivery pump to maintain such constant pressure would be to place a pressure sensing device in the hose just upstream of the hose nozzle, and to run connections from the sensing device back along the hose to a control system for the pump in the tanker aircraft. Such an arrangement is undesirable since the hose becomes encumbered with extra devices which may be damaged and rendered inoperative in use.

The present invention provides an arrangement whereby a control pressure is derived close to the pump, which for all practical purposes, is equal to, and varies with, the pressure in the conduit at a point therein which is a substantial distance downstream from the pump.

The object of the invention is to provide a pressure sensing system for a fluid pump and to use such a system to control the output pressure of a pump. A further object is to provide an automatic arrangement for slowing down the pump when there is no flow or unrestricted flow from the pump; that is, when the pressure at a downstream position in the delivery conduit is the same as the pump output pressure, or when there is very little pressure at the pump outlet or delivery point.

Figure 2:
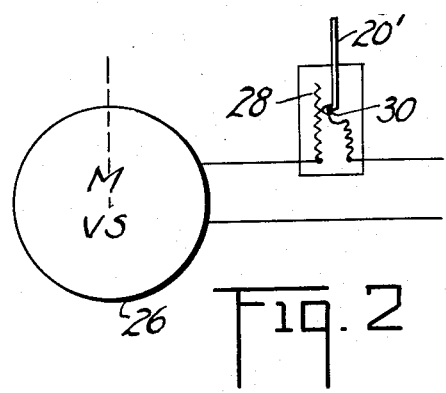
Figure 3:
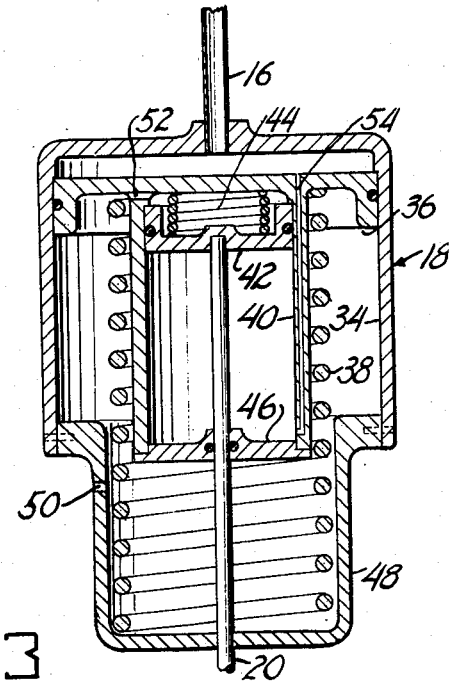

Further objects of the invention will become apparent in reading the following detailed description and claims. Reference may also be made to the attached drawings, in which similar reference characters designate similar parts, and in which:

Figure 1 is a schematic representation of a pump system including the invention, Figure 2 is a schematic representation of an alternative part of the pump system, and Figure 3 is an enlarged section through a control component of the invention.

In Fig. 1, I show a centrifugal pump 5 which may be mechanically driven through a connection 6 by a turbine 7. The turbine is driven by a compressed gas or steam which enters through a duct 8, the latter being provided with a throttle valve 9. Adjustment of the throttle valve regulates the flow of fluid to the turbine, thereby controlling its speed and controlling the speed of the pump 5. Control of pump speed as is well known, controls the outlet pressure and the flow. Fluid is delivered from the pump 5 to a connection 10 to which is secured a venturi 11. To the outlet of the venturi is secured a delivery conduit 12 which may terminate in a valve 13 and a nozzle 14. The delivery end of the conduit 12 may be connected as desired to any load or mechanism requiring fluid from the pump 5.

Under normal conditions of operation, there will be back pressure and a substantial flow of pumped fluid through the conduit 12 and accordingly, there will be a pressure drop in the conduit from the entry end to the delivery end. This drop varies with the flow through the conduit. In the particular utilization of the system for which my control system is adapted, it is desirable to maintain substantially constant pressure at the delivery end of the conduit 12 regardless of the rate of fluid flow. For convenience, this pressure is indicated at $p4$. The pressure at the entry to the conduit 12 is indicated as $p2$, and the pump outlet pressure is indicated at $p1$. To maintain $p4$ constant, depending upon resistance to flow in the valve 13, or in the load downstream of the valve, $p2$ must necessarily vary and consequently, the speed of operation of the pump 5 must vary. If $p4$ could be sensed easily, it could be used as a control quantity to control the speed of the pump 5 and hence, the position of the turbine throttle 9. However, since $p4$ may exist at a point which is far removed from the pump, sensing and transmitting this pressure becomes a nuisance.

According to my invention, the venturi 11 enables simulation of the pressure drop through the conduit 12. The venturi is so designed that throat pressure $p3$ is equivalent to the conduit pressure $p4$. As is well known, the velocity of flow at the throat of a venturi is increased and the pressure is decreased. By appropriate design of the venturi, $p3$ may be made equal to $p4$ and the variations of $p3$ and $p4$ will remain in consonance over a wide range of flow and pressure in the system.

The pressure $p3$ is sensed by a tube 16 entering the venturi throat, and this tube leads to a servo device 18. The device is provided with an output control rod 20 connected to the throttle 9. The servo device 18, as will be described, converts the input pressure to movement of the control rod by which turbine speed is controlled to yield a pump pressure $p1$ which in return will yield a constant pressure at $p3$ and $p4$.

To provide flexibility in the system for varying lengths of delivery conduit 12 or for different flow characteristics in conduit 12, a bleed connection 22 is led into the exit end of the venturi whereat the pressure will be $p2$ which is normally greater than $p3$. A valve 24 is installed in the connection 22 which communicates with the tube 16. By adjusting the valve 24, the useful value of $p3$ may be established at some level between venturi throat pressure and venturi recovery pressure. As is well known, there is a slight drop in pressure across the venturi whereby the venturi recovery pressure $p2$ will be approximately 95% of the pump delivery pressure $p1$.

While Fig. 1 shows a fluid turbine 7 driving the pump 5, any desirable sort of motor may be used to drive the pump. For instance, Fig. 2 shows a variable speed electric motor 26 which may be used to drive the pump in lieu of the turbine. Control of motor speed may be accomplished by a rheostat 28, the resistance of which is controlled by a slider 30 connected to the control rod 20'. This is equivalent to the control rod 20 of Fig. 1 which is the output element of the servo device 18. Any of the various types of speed controls for electric motors may be used instead of the rheostat 28.

Alternatively, other kinds of controllable speed prime movers may be used instead of turbines or electric motors.

Reference may now be made to Fig. 3 which shows the details of the servo device 18. The device comprises a closed-top cylinder 34 containing a slidable piston 36, the piston being urged upwardly as shown by a calibrated spring 38. Tube 16 enters the top of the cylinder 34 and exerts pressure on the top of the piston 36, tending to compress the spring and lower the piston. Beneath and secured to the piston 36 is a second cylinder 40, containing a second piston 42. The piston 42 is urged downwardly as shown by a light spring 44.

The control rod 20 is secured to the piston 42, and extends, slidably, through a lower closure 46 for the bottom of cylinder 40 and thence passes in slidable relation through a bottom housing 48 secured to the lower end of cylinder 34. A lower part of the cylinder 34 is vented to atmosphere at 50. The upper part of cylinder 40 is vented to the lower part of cylinder 34 by a vent 52. Pressure above the piston 36 is communicated to the lower part of the cylinder 40, below piston 42, by a conduit 54 in the body of the piston 36 and wall of the cylinder 40.

If the pump 5 is operating and there is little or no flow from the conduit 12, which would occur if the valve 13 were nearly closed or closed, there will be little or no pressure drop in the system and the pressures $p1$, $p2$, $p3$ and $p4$ will be substantially equal. Obviously $p3$ and $p4$ will both be greater in value than they would be if there were flow through the system. In this condition, the piston 36 in device 18 will be driven down to throttle the prime mover and the pump to idling speed. When flow starts through the system, as by opening the valve 13, $p3$ and $p4$ will both decrease in substantially the same amount, whereby the spring 38 works against $p3$ and the throttle 9 will open to increase the speed and delivery pressure from the pump 5. The system will stabilize at a throttle setting to maintain $p3$ at a substantially constant value regardless of flow. By design, $p4$ is equivalent to $p3$ and, thus, $p4$ will be maintained substantially constant.

In both the above conditions, piston 42 is held up, compressing the light spring 44 because of relatively high pressure $p3$ existing in the bottom of cylinder 40.

If outlet pressure from the pump 5 drops materially, as by a failure in the downstream parts of system or cavitation at the pump inlet, $p3$ will drop likewise. If this occurs, piston 42 will be urged downwardly by spring 44 and will close the throttle 9 through the control rod 20, even though the control piston 36 has been driven upwardly by spring 38 due to lack of pressure above the piston 36. This provides a safety device to close down the prime mover and pump in the event that no pressure is present in delivery conduit 12 or at the venturi.

The several pressures $p1$–$p4$ are considered as gage pressures above atmospheric and it is for this reason that vents 50 and 52 are provided. If absolute pressures are to be used, the vents would be backed up by sealed cells.

While my system is mentioned for air-to-air refueling of aircraft, it is not limited to such use. It may be incorporated in any system where a constant pressure downstream of a pump is desired, and may be used with elastic as well as inelastic fluids.

While several embodiments of the invention have been shown and described, it is to be understood that various changes and modifications may be made within the scope and spirit of the invention. Reference may be made to the appended claims for a definition of the limits of the invention.

I claim:

1. In a pump system including a controllable fluid delivery pump, said pump having an extended delivery conduit having tangible pressure drop therealong between its inlet and a preselected point downstream therein, a venturi at the pump outlet upstream of said conduit having a throat the pressure at which is equal to the pressure at said point in the conduit, said venturi having a zone at its downstream end whereat the pressure is substantially equal to pump delivery pressure, said latter pressure normally being greater than the pressure at said venturi throat when said pump is delivering fluid, means, including a fixed pressure reference element, connected to said venturi throat, said means having a movable member acted upon on one side by the venturi throat pressure in opposition to said fixed pressure reference element, and an operating connection from said movable member to control the fluid delivery of said pump.

2. In a fluid pump system comprising an adjustable output pressure pump having an extended delivery conduit and means for varying the pressure and quantity of fluid delivered by the pump, a venturi at the pump outlet, having a throat, the pressure at which is equivalent to the pressure at a preselected downstream location in the conduit, a control device having a pressure inlet connected to the venturi throat, an operating connection from said device to said varying means to adjust the output of fluid from said pump, conduit means connecting the throat of said venturi with the downstream end of said venturi, and a manually adjustable calibrating valve in said conduit to adjust the open area thereof.

3. In a fluid pump system comprising an adjustable output pressure pump having an extended delivery conduit and means for varying the pressure and quantity of fluid delivered by the pump, a venturi at the pump outlet, having a throat the pressure at which is equal to the pressure at a preselected downstream location in the conduit, a control device comprising a cylinder having a piston slidable therein, a spring urging said piston in one direction, conduit means between said cylinder to the throat of said venturi by which the pressure in said venturi throat is communicated to said cylinder and acts on said piston in opposition to the force of said spring, and an operating connection from said piston movable therewith, connected to said varying means to adjust the output of said pump.

4. In a fluid pump system comprising an adjustable output pressure pump having an extended delivery conduit and means for varying the pressure and quantity of fluid delivered by the pump, a venturi at the pump outlet, having a throat the pressure at which is equivalent to the pressure at a preselected location in the conduit, a control device comprising a cylinder having a piston slidable therein, a spring urging said piston in one direction, conduit means between said cylinder to the throat of said venturi by which the pressure in said venturi throat is communicated to said cylinder and acts on said piston in opposition to the force of said spring, said piston carrying a second cylinder, a second piston slidable in said second cylinder, a light spring in said second cylinder urging said second piston in a direction opposite to the direction of action of said first spring, the side of the second piston opposing the force of said light spring being connected to said venturi throat, and an operating connection from said second piston to said speed varying means.

5. In a control system comprising an adjustable output pump having an extended delivery conduit, a venturi at the pump outlet, having a throat the pressure at which is equivalent to the pressure at a preselected downstream location in the conduit, a control device comprising a cylinder, a pressure transfer connection from the throat of said venturi of said cylinder, a piston slidable in said cylinder and acted upon on one side by venturi throat pressure, resilient means acting on said piston in opposition to said throat pressure, a second cylinder on the piston, a second piston slidable therein and connected to adjust the output of said pump, said second cylinder including conduit means communicating with venturi throat pressure, and a light spring acting on said second piston against venturi throat pressure.

6. A control system according to claim 5 wherein said resilient means acts on said first piston in one direction, and said light spring acts on the second piston in the opposite direction.

7. In a variable speed pump system, means for varying pump speed, means for regulating pump output to a value to yield a substantially fixed pressure at a preselected remote point downstream of said pump, comprising a venturi at the pump outlet having a throat the pressure at which is equal to the pressure at said remote point and through which pump output passes, a device having a conduit connected with the venturi throat, a substantially fixed pressure reference element, and means in said device comparing venturi throat pressure and the fixed reference pressure of said element and connected to operate said pump speed varying means upon inequality in the reference and venturi throat pressures.

8. In a variable speed pump system, means for varying pump speed, means for regulating pump output to a value to yield a substantially constant pressure at a preselected remote point downstream of said pump and to shut down said pump when no output pressure can be maintained, comprising a venturi at the pump outlet, having a throat the pressure at which is equal to the pressure at said remote point and through which pump output passes, a device having a conduit connected with the venturi throat, a substantially fixed pressure reference element, means in said device comparing venturi throat pressure and the fixed reference pressure of said element and connected to operate said pump speed varying means upon inequality in the reference and venturi throat pressures, and means forming part of said device responsive to a substantial drop in venturi throat pressure connected to operate said pump speed varying means in a direction to materially reduce pump speed.

References Cited in the file of this patent

UNITED STATES PATENTS

| | | |
|---|---|---|
| 1,129,009 | Petermoller | Feb. 16, 1915 |
| 1,154,959 | Banner | Sept. 28, 1915 |
| 1,262,225 | Meyer | Apr. 9, 1918 |
| 1,280,477 | Hopkins | Oct. 1, 1918 |
| 1,893,200 | Dolbey et al. | Jan. 3, 1933 |
| 1,910,202 | Crago | May 23, 1933 |
| 1,916,433 | Muller | July 4, 1933 |
| 1,934,759 | Adelson | Nov. 14, 1933 |
| 2,018,119 | Brouse | Oct. 22, 1935 |
| 2,102,865 | Vickers | Dec. 21, 1937 |
| 2,112,441 | Lewis | Mar. 29, 1938 |
| 2,163,281 | Hillier | June 20, 1939 |
| 2,395,657 | Dinsmore et al. | Feb. 26, 1946 |
| 2,408,851 | Hillier et al. | Oct. 8, 1946 |
| 2,411,574 | Hunt | Nov. 26, 1946 |
| 2,735,368 | Antonazzi | Feb. 21, 1956 |
| 2,747,598 | Wooldridge | May 29, 1956 |
| 2,752,858 | Berges | July 3, 1956 |
| 2,771,843 | Brown | Nov. 27, 1956 |
| 2,889,780 | Binford | June 9, 1959 |

FOREIGN PATENTS

| | | |
|---|---|---|
| 101,783 | Australia | Aug. 6, 1937 |
| 109,421 | Great Britain | Sept. 13, 1917 |
| 240,405 | Germany | Nov. 3, 1911 |
| 513,330 | Germany | Nov. 26, 1930 |
| 691,547 | Germany | May 30, 1940 |
| 813,625 | France | June 5, 1937 |